United States Patent [19]

Thompson et al.

[11] 4,078,856
[45] Mar. 14, 1978

[54] LIGHT VALVE

[75] Inventors: Robert I. Thompson, Plainview; Robert L. Saxe, New York, both of N.Y.

[73] Assignee: Research Frontiers Incorporated, Plainview, N.Y.

[21] Appl. No.: 667,665

[22] Filed: Mar. 17, 1976

[51] Int. Cl.² .............................................. G02F 1/16
[52] U.S. Cl. ............................................................ 350/362
[58] Field of Search ........................ 350/160, 161, 267; 340/324 R, 324 M

[56] References Cited

U.S. PATENT DOCUMENTS

| 3,257,903 | 6/1966 | Marks | 350/160 R |
|---|---|---|---|
| 3,341,274 | 9/1967 | Marks | 350/160 R |
| 3,743,382 | 7/1973 | Rosenberg | 350/160 R |
| 3,841,732 | 10/1974 | Marks | 350/160 R |

Primary Examiner—William L. Sikes
Attorney, Agent, or Firm—Jacobs & Jacobs

[57] ABSTRACT

A light valve and fluid suspension therefor which when activated decrease the transmission of radiation therethrough.

12 Claims, 11 Drawing Figures

LIGHT VALVE

FIELD OF THE INVENTION

This invention relates to light control devices and fluid suspensions therefor and especially to devices known as light valves which include a cell which contains a fluid suspension of minute particles capable of having their orientation changed by an electric field to vary the transmission of light through the suspension.

BACKGROUND OF THE INVENTION

Light valves, fluid suspension devices which control the transmission of light, have been known for many years. These devices usually operate in a manner so as to increase the transmission of radiation when the device is activated (by applying a field across the suspension), and return to a state of less transmission when the device is inactivated. There are many uses for such a light valve. However, there has always been a desire to have a light valve which operates so that when activated it would decrease the transmission of light from that in the inactive condition. In other words, as the cell was activated, the amount of light that could pass through would be less than before the cell was activated. Such a cell would be advantageous to have since it would provide a fail-safe feature in many applications. For example, for use in automobile windshields, automobile rear view mirrors, windows in buildings, space helmets, etc. It would be particularly useful to have a light valve that was clear or permitted substantial transmission of light in the inactive condition and was dark and prevented the transmission of light in the activated condition. Thus, in the aforementioned examples, if the light valve failed for some reason it would fail-safe since the light valve would become transparent in the inactive condition. Thus, the automobile windshield would be clear as well as the rear view mirror and the windows in the space helmets. If prior art fluid suspension light valves were used in the aforementioned examples, they would tend to fail in an unsafe condition. For example, if such a prior art light valve was used as a windshield in an automobile for the purpose of controlling glare and sunlight, and the electrical system which controls the windshield accidently failed while the vehicle was in motion, the light valve would become deactivated and dark and the driver's view would suddenly become blocked. On the other hand, if the light valve operated in the reverse mode, that is, normally clear in the inactive condition and dark in the activated condition, if the electrical system should fail the light valve would become deactivated and transmissive and thus the driver would have a clear view of the road. Likewise, a rear view mirror made in such a manner for use to control glare from headlights would also be fail-safe. The mirror would remain useful and clear even if the activating electrical system failed. In a similar manner, if such a reverse operating light valve were used as a window in a space helmet, the helmet would become clear if the electrical system failed. Similarly when such a reverse operating light valve is used for the windows in a building to control sunlight and glare the fail-safe feature operates so that if the light valve fails accidently light will still come in to illuminate the inside of the building. If the accidental deactivation of the valve were caused by the failure of the electrical power system in the buiding the fail-safe feature enables the interior to remain illuminated from the outside whereas otherwise the building would become dark.

There has been some attempt to make fluid suspension light valves which would become dark on the application of a voltage; however, these have operated in what can be described as a see-saw manner in that some parts of the spectrum become darker, while others simultaneously become more transmissive. A patent that discloses this is Rosenberg, U.S. Pat. No. 3,743,382. Briefly, when such a light valve is activated there is an increase in the transmission of radiation through the valve in one part of the electromagnetic spectrum and a decrease in transmisson in another part.

Thus, for the reasons aforementioned, it would be of substantial practical advantage to have light valves that operate in the reverse mode throughout the visible spectrum.

SUMMARY OF THE INVENTION

It is an object of this invention to provide a light valve and fluid suspensions therefor, which when activated, decrease the transmission of radiation therethrough.

It is another object of this invention to provide a light valve which operates in the reverse mode throughout the visible spectrum.

Another object of this invention is to provide a light valve and fluid suspensions therefor, which when activated below a particular frequency will decrease the transmission of radiation therethrough; when activated at the particular frequency will not affect the transmission of radiation through the suspension; and when activated above the particular frequency will increase the transmission of radiation through the suspension.

Another object of this invention is to provide a light valve which contains the fluid suspension materials described herein.

A still further object of this invention is to provide such a light valve for use as a fail-safe feature in windows, windshields, space helmets, rear view mirrors and other such applications.

In carrying out the objects of this invention, a light valve is provided which includes fluid suspensions such that when activated the transmission is decreased throughout the entire electromagnetic spectrum.

PREFERRED EMBODIMENT OF THE INVENTION

This invention is concerned with light control devices more commonly known as light valves of the type which consist of cells containing a fluid suspension therein which changes the transmission of radiation through the cell when a field is applied across the suspension. A typical example of such a light valve has thin, transparent walls constructed of flat glass or similar material and separated by a small gap which is filled with a fluid suspension containing small particles distributed therein. These particles will align themselves when a field is placed across the suspension. To place the field across the suspension, a thin layer of transparent, conductive material is coated on the inner side of both sheets of glass, either in contact with the suspension, or spaced from the suspension by a thin, transparent, non-conducting layer. The conductive layers are connected to an energy source by suitable wiring. In the prior art, upon the application of a voltage across the suspension, the particles in the suspension are oriented so as to cause the suspension to be transparent; whereas, before the application of the voltage, the particles in the suspension were disoriented and therefore the suspension was opaque.

Figures 1, 2, 3, 4:
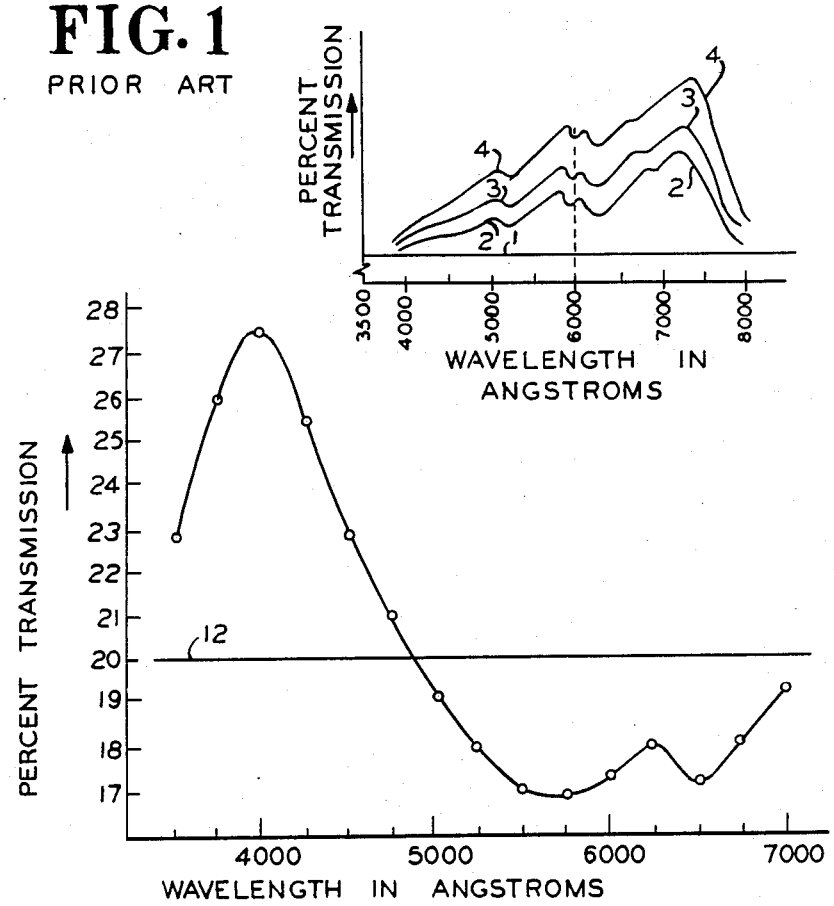
FIG. 1 illustrates transmission through the ordinary prior-art light valve.
FIG. 2 illustrates transmission through the light valve of U.S. Pat. No. 3,743,382 (Prior Art).
FIG. 3 illustrates a particular light valve for use with this invention.
FIG. 4 is a cross-section of the light valve of FIG. 3.

A typical light valve cell is shown in perspective in FIG. 3 and in cross-section in FIG. 4.

The suspension is placed in the valve between its two transparent plates. On the inside of each of these plates is a conductive coating which may be in contact with the suspension (it can also be separated from the coating by a thin layer of insulating material). In FIGS. 3 and 4, the plates are designated 2 and 3, the conductive coatings 4 and 5, and the suspension therebetween, 6. A suitable sealant 7 is also provided to prevent the suspension from escaping from the valve.

The suspending medium of the suspension may be a liquid or a gas; however, better results seem to be achieved with a liquid because its specific gravity makes it easier to keep the particles in suspension for longer periods of time. It also appears to be preferable for the fluid and the suspended particles to have specific gravities that are as close to each other as practical. When the specific gravities are close to each other, there is less chance of the suspended particles coming out of the suspension, for example, by settling. The particles may be of any suitable shape. One preferred shape is an elongated lath or rod which has a high ratio of length to crossdiameter. This may range up to about 25 to 1.

FIG. 1 is a graph showing wavelength vs. transmission for a valve of the prior art, a valve containing a suspension where increasing voltage causes increasing transmission. In this graph, wavelength in Angstrom units is plotted along the X axis, and increasing transmission is plotted along the Y axis. The horizontal straight line 1 on the graph represents the transmission of radiation through the valve when no activating voltage is applied to the conductive surfaces. It will be appreciated that the transmission through the valve in the off condition is not necessarily zero and that is the reason why straight line 1 is not shown at the position of zero transmission.

The curves 2, 3 and 4 of FIG. 1 represent transmission through the above prior art light valves with applied voltages. Curve 2 in FIG. 1 represents the transmission of radiation through the valve at one activating voltage and frequency. Curve 3 represents the transmission of radiation at another voltage and frequency, and curve 4 represents the transmission at still another activating voltage and frequency. As the activating voltage and frequency are varied, the transmission varies from one to another of the family of curves 2, 3 and 4, but the transmission is always greater than the transmission when no voltage is applied.

FIG. 2 is a graph showing the transmission of a typical light valve in accordance with the aforesaid U.S. Pat. No. 3,743,382. When activated, the light valve increases the transmission of radiation through it in one part of the visible spectrum and decreases the transmission through it in another part of the visible spectrum. In the graph, percent transmission of radiation is plotted along the Y axis and the wavelength in Angstrom units is plotted along the X axis. The straight line 12 in the figure represents the transmission of the inactivated valve normalized to the same transmission for all wavelengths (20 percent). It is not actually the same for all wavelengths in the activated state, but for ease in illustration, transmission for all wavelengths has been normalized to the same value and transmission in the activated states has been correspondingly changed. It will be seen from this graph that when voltage is applied, the transmission in one part of the visible spectrum (below about 4,900 Angstroms) increases above the transmission for the inactivated valve, and in another part of the visible spectrum (above about 4,900 Angstroms) decreases below the transmission for the inactivated valve. There is also a wavelength at about 4,900 Angstroms (for this example) where transmission is the same in both the activated and inactivated states. At this wavelength, which is referred to as the cross-over point, activating the light valve will have no effect on transmission through the valve.

When these prior art light valves are activated by an applied voltage, the valve either becomes optically less dense and transmits more light through it than when no voltage is applied, and this occurs throughout all wavelengths, or in the case of U.S. Pat. No. 3,743,382 it becomes optically less dense at some points in the spectrum and optically more dense at others. Thus, with the prior art valves, there is no possibility of decreasing the transmission throughout the range of wavelengths. There will always be some parts of the spectrum where it will increase. However, with the valve of the present invention, this can be accomplished.

FIGS. 5-10 show the transmission characteristics of typical light valves in accordance with the present invention, light valves which, when activated at an appropriate frequency, decrease the transmission of radiation throughout the spectrum. In the figures, percent of transmission of radiation or optical density is plotted along the Y axis. The curves are for Example I, which is discussed hereinafter. It should be noted, however, that this is one example of the valves of this invention; it will be appreciated that there are valves that have substantially greater or lesser transmission in the activated condition, but in any case, the inactivated transmission is always greater than the activated condition. The examples mentioned, hereinafter will bring this out in more detail.

It will be appreciated, that by the use of this valve, fail-safe systems can be provided so that if the applied voltage fails, the light transmission in the inactivated condition will always be greater than in the activated condition.

Now describing typical examples of the invention:

EXAMPLE I

In this example, a suspension of quinine bisulfate (QBS) periodide is prepared in accordance with the six steps listed below, using the following tetrapolymer:

Poly (3,5,5 trimethyl-1-hexyl acrylate/2-hydroxypropyl acrylate/di-2-ethylhexyl fumarate/fumaric acid) in the monomer percentages by weight 37.5/22/37.5/3.

Step 1: Dissolve 2 grams of the tetrapolymer in 20 grams of alcohol. Mix thoroughly, in a high speed mixer, with 16.6 grams of tricresyl phosphate (TCP). Optionally, the TCP need not be added.

Step 2: Add 7.3 grams of methyl alcohol to 3.7 grams of quinine bisulfate (QBS), and stir until the QBS is dissolved. Add this solution to the mixture made in Step 1, and mix thoroughly in the high speed mixer.

Step 3: Dissolve 1.8 grams of iodine crystals in 10 grams of n-propanol. Then dissolve 0.54 grams of calcium iodide in 0.25 grams $H_2O$ and add it to the iodine-propanol solution. Shake until well-mixed.

Step 4: The mixture of Step 3 is poured into the mixture of Step 2 while the latter mixture is in the mixer operating at high speed. The mixer then remains at high speed for approximately 35 seconds, and is then stopped.

Step 5: The resulting mixture is spread approximately 8 mils thick on a glass plate to dry for approximately 40 minutes in an atmosphere of 78° F. and 50 percent relative humidity.

Step 6: The paste that results from Step 5 is scraped from the glass plate with a sharp blade. This paste is then added to a jar containing 10 milliliters of chloroform ($CHCl_3$), 20 milliliters of isopentyl acetate (IPA), 70 milliliters of Freon-113 (a trademarked product manufactured by E. I. du Pont de Nemours & Co.) and placed in a shaker for about 10 minutes. This mixture is then placed in an ultrasonic generator operating at about 47 KHz for about 17 hours.

EXAMPLE II

Tetrapolymer: poly (3,5,5 trimethyl-1-hexyl acrylate/2-hydroxypropyl acrylate/vinylidine chloride/fumaric acid), in the monomer percentages by weight 75/15/10/3.

A suspension was made in accordance with the method of Example I, with the following exceptions. In Step 1, the polymer of Example II was used instead of the polymer of Example I; and in Step 3, 0.78 grams of cesium iodide was used instead of 0.54 grams of calcium iodide.

EXAMPLE III

Tetrapolymer: poly (3,5,5 trimethyl-1-hexyl acrylate/2-hydroxypropyl acrylate/di-ethylhexyl maleate/fumaric acid), in the monomer percentages by weight 37.5/22/37.5/3.

A suspension was made as in Example I, except that the polymer of Example I is replaced by the polymer of Example III.

EXAMPLE IV

Tetrapolymer: poly (3,5,5 trimethyl-1-hexyl acrylate/2-hydroxypropyl acrylate/di-butyl tin laurate maleate/fumaric acid), in the monomer percentages by weight 37.5/22/37.5/3.

A suspension was made in accordance with Example I except that the tetrapolymer of Example I was replaced by the tetrapolymer of Example IV.

EXAMPLE V

Tetrapolymer: poly (3,5,5 trimethyl-1-hexyl acrylate/2-hydroxypropyl acrylate/di-ethylhexyl maleate/fumaric acid), in the monomer percentages by weight 37.5/22/37.5/3.

A suspension was made in accordance with Example I except that the tetrapolymer of Example I was replaced by the tetrapolymer of Example V.

EXAMPLE VI

Tetrapolymer: poly (3,5,5 trimethyl-1-hexyl acrylate/2-hydroxypropyl acrylate/distearyl fumarate/fumaric acid), in the monomer percentages by weight 37.5/22/37.5/3.

A suspension was made as in Example I, except that the polymer of Example I was replaced by the polymer of Example VI.

EXAMPLE VII

Terpolymer: poly (3,5,5 trimethyl-1-hexyl acrylate/2-hydroxypropyl acrylate/fumaric acid), in the monomer percentages by weight of 75/22/3.

A suspension was made as in Example I, except that the tetrapolymer of Example I was replaced by the terpolymer of Example VII.

The fluid suspensions from the aforesaid seven examples were placed, one at a time, in a light valve of the type described above and illustrated in FIGS. 3 and 4. The thickness of the suspension i.e. the distance between the conductive coatings 4 and 5 that were in contact with the suspension was 33 mils.

A beam of white light, from an incandescent lamp, impinged normally upon the cell, and the percent of light transmitted by the cell was measured by means of a photomultiplier while the voltage and frequency of the applied electric field was varied.

Results are given in Table I for the suspension of Example I. At frequencies of 60 Hz, 11KHz and 22 KHz, the transmission decreases when voltage is applied, i.e., the light valve closes; and the transmission continues to decrease more as the voltage increases. This effect is the reverse of the prior art.

TABLE I

| Frequency Hertz | Volts peak-to-peak | Percent Transmittance |
|---|---|---|
| 60 | 0 | 21 |
| 60 | 100 | 18 |
| 60 | 350 | 13 |
| 60 | 700 | 12 |
| 11,000 | 0 | 21 |
| 11,000 | 100 | 19 |
| 11,000 | 350 | 13 |
| 11,000 | 700 | 12 |
| 22,000 | 0 | 21 |
| 22,000 | 100 | 21 |
| 22,000 | 350 | 18 |
| 22,000 | 700 | 16 |
| 25,000 | 0 | 21 |
| 25,000 | 100 | 22 |
| 25,000 | 350 | 20 |
| 25,000 | 700 | 18 |
| 30,000 | 0 | 21 |
| 30,000 | 100 | 22 |
| 30,000 | 350 | 24 |
| 30,000 | 700 | 25 |
| 100,000 | 0 | 21 |
| 100,000 | 100 | 23 |
| 100,000 | 350 | 37 |
| 100,000 | 700 | 45 |

Table I shows also that at approximately 25 KHz, the transmission is almost unaffected when voltage is applied, i.e., the light valve neither opens nor closes. At high frequencies, i.e., at 30 KHz, and 100 KHz, the transmission increases, i.e., the light valve opens as in prior art valves.

Figure 5:
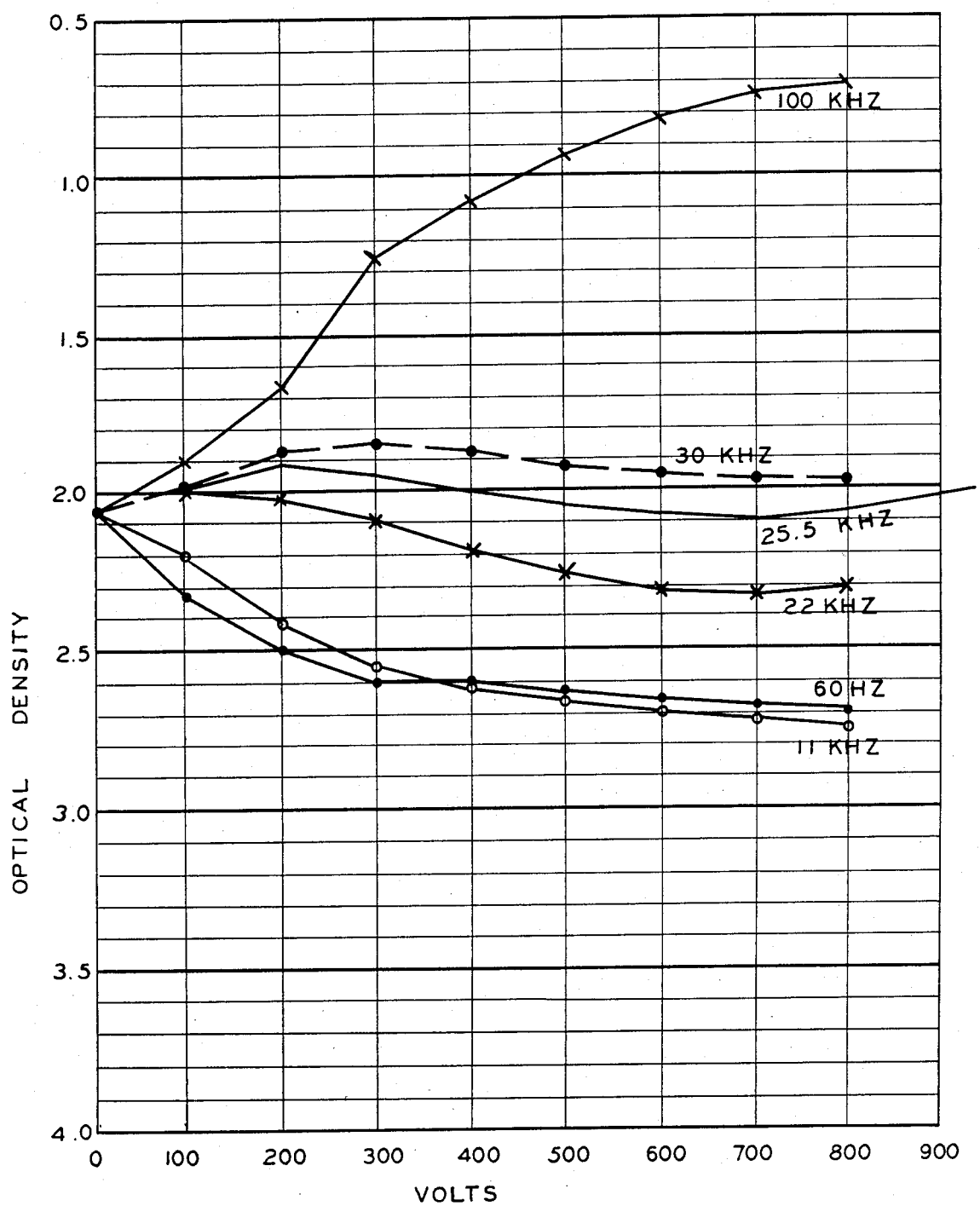
FIG. 5 is a plot of optical density vs. voltage for the light valve of this invention.

Table I gives data for the suspension of Example I diluted to a transmittance of 21 percent when the light valve is not activated. A transmittance of 21 percent is the same as an optical density of 0.68. Another set of data is plotted in FIG. 5 for a suspension of Example I diluted to an optical density of 2.05, or 0.89 percent transmission. FIG. 5 shows the variation of optical density with peak-to-peak voltage applied at frequencies of 60 HZ, 11KHZ, 25.5KHz, 30KHz and 100KHz. At the first three of the aforesaid listed frequencies the optical density increases, i.e. the light valve closes, when activating voltage is applied. This is opposite to the teachings of prior art. In general, in the prior art at these frequencies the optical density continues to decrease with increasing voltages until saturation sets in, i.e., until the curves flatten out, at the higher voltages.

At approximately 25.5 KHz, the optical density does not change appreciably when voltage is applied i.e., the light valve neither opens nor closes when it is activated. This is called the cross-over frequency. At frequencies of about 30KHz and higher frequencies, e.g., at 100KHz, the light valve opens, i.e., the density decreases when voltage is applied.

Figure 6:
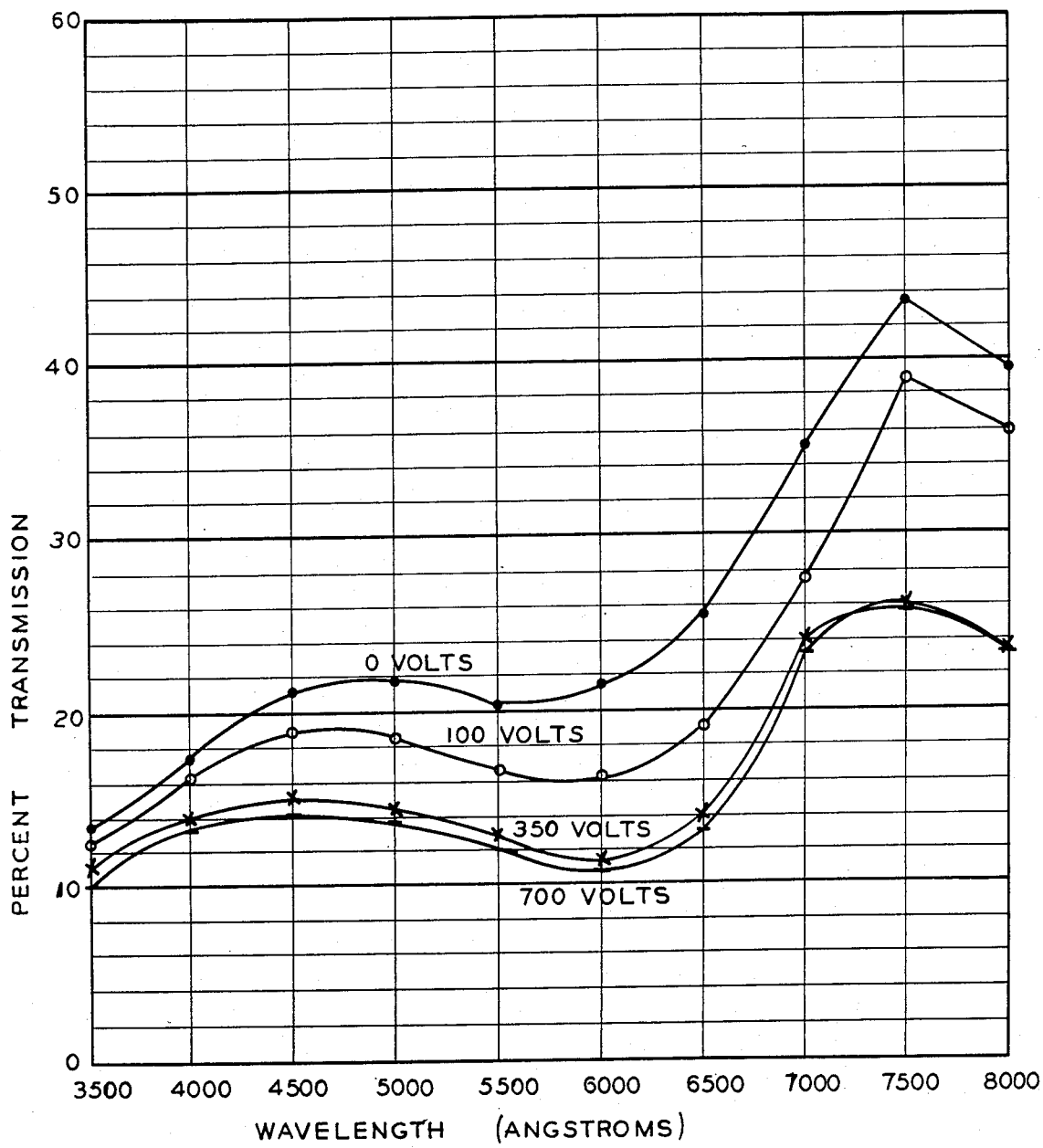
FIG. 6 is a plot of percent transmission vs. wave length for a light valve of this invention.
Figure 7:
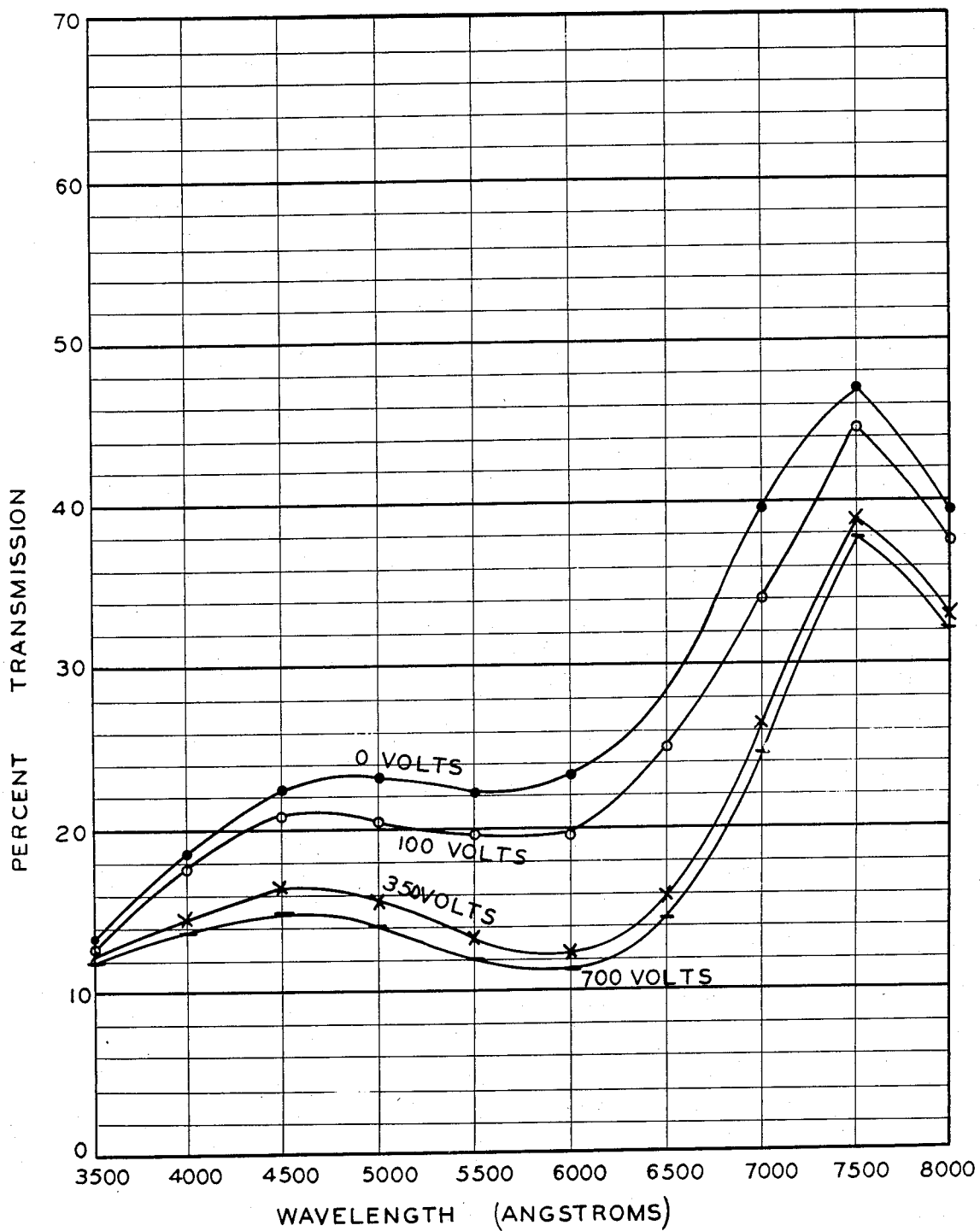
FIGS. 7-11 are similar graphs of percent transmission vs. wavelength for light valves of this invention using other suspensions, as will be described hereinafter.
Figure 8:
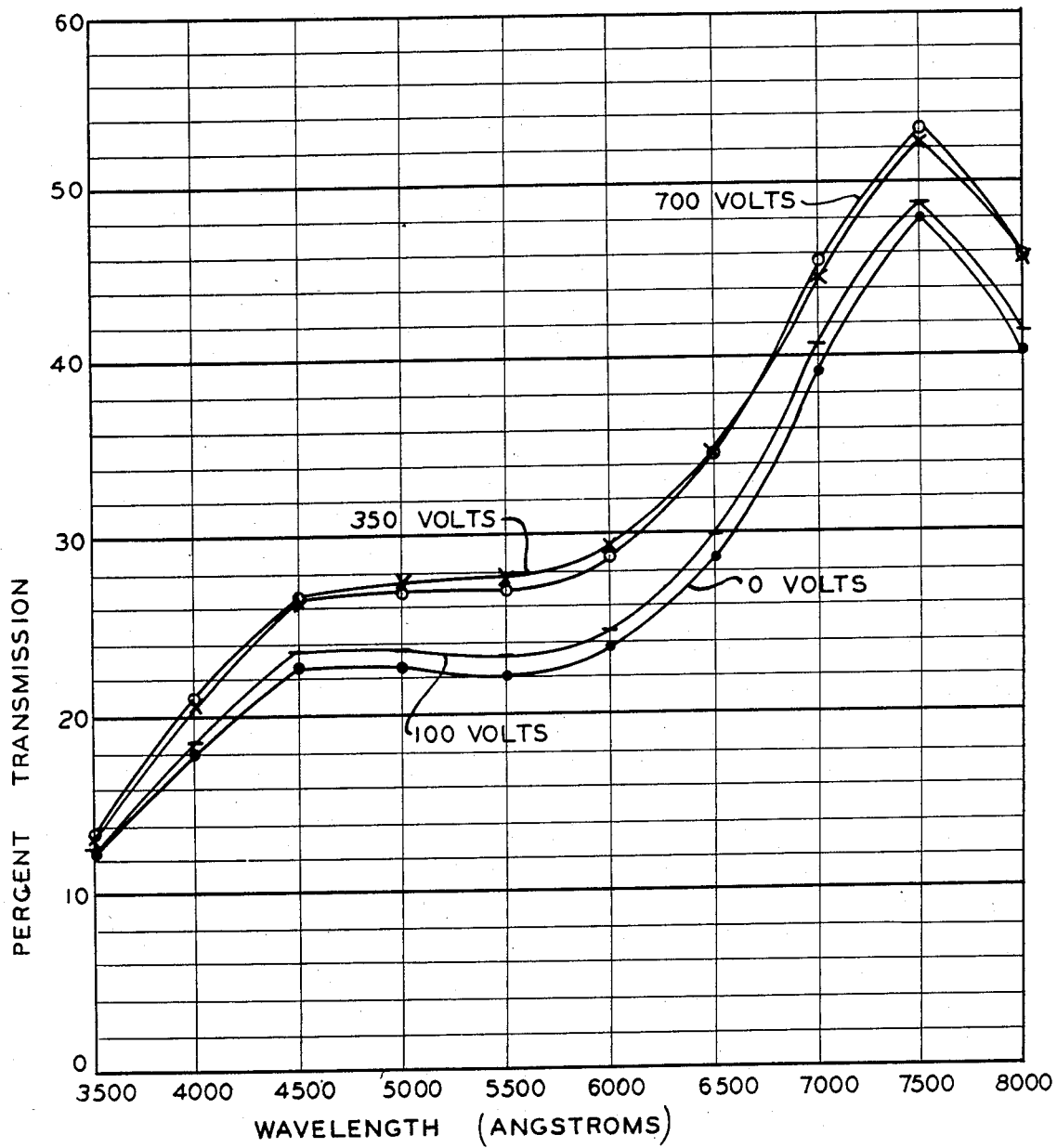
Figure 9:
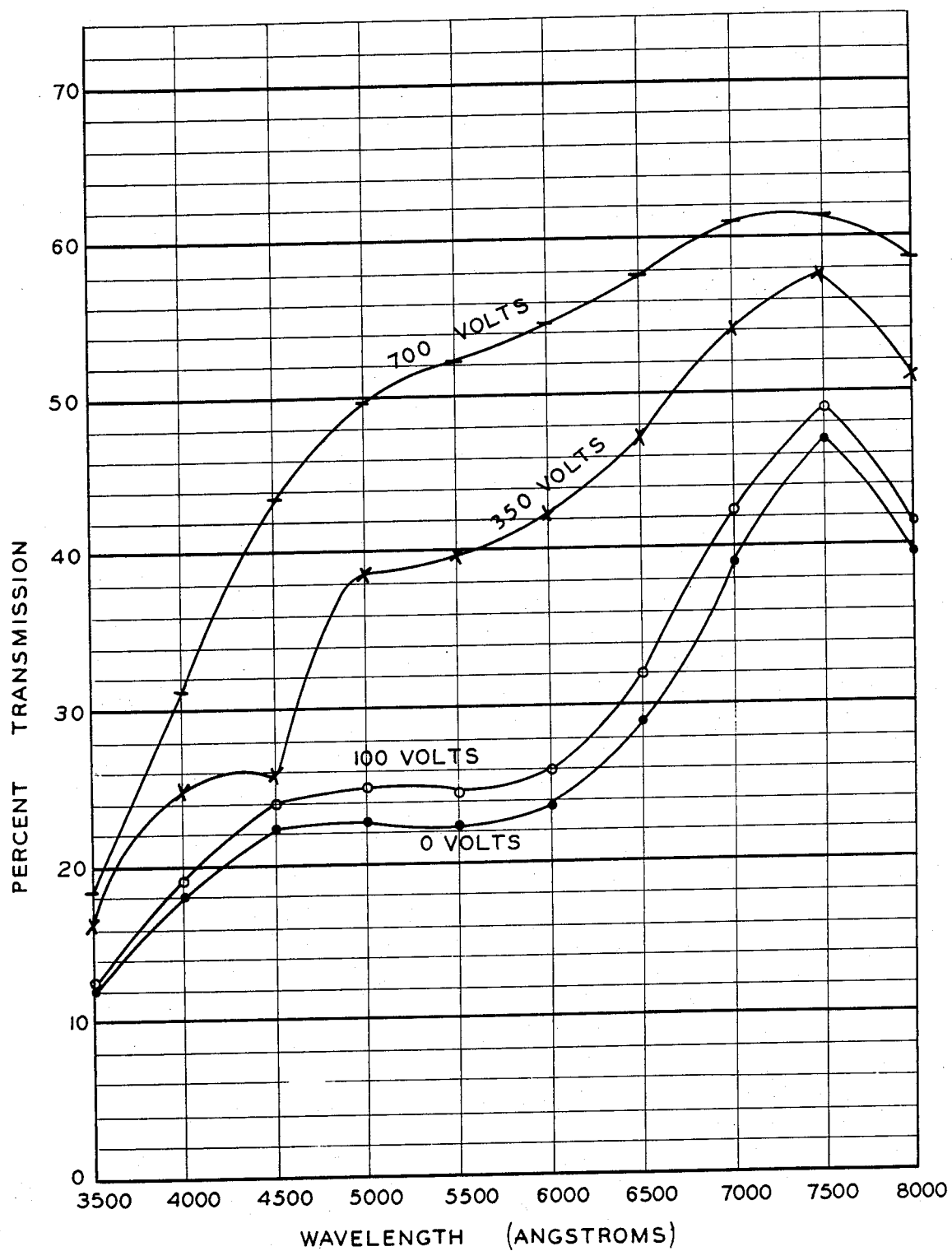

The spectral transmission of the light valve filled with the suspension of Example I was measured by means of a spectrophotometer, at various activating frequencies and voltages. The results are plotted in FIGS. 6, 7, 8 and 9. These figures are plots of percent transmission as a function of wavelength from 3500 Angstroms to 8000 Angstroms. FIG. 6 is for an activating electrical frequency of 60 Hz; FIG. 7 is for 11 KHz; FIG. 8 is for 30 KHz; and FIG. 9 is for 100 KHz. In each of these four figures, curves are plotted for activating voltages of 100, 350 and 700 volts peak-to-peak; and for zero volt, i.e., for the light valve in its inactivated state.

In FIGS. 6 and 7, at activating frequencies of 60 Hz and 11 KHz respectively, all the transmission curves for the activated light valve are below the curves for the inactivated valve, throughout the spectral range from 3500 to 8000 Angstroms. In other words, the light valve and suspension of this invention close at all wavelengths in this spectral range, at all activating voltages. At these frequencies, the light valve operates opposite to the prior art.

Figure 10:
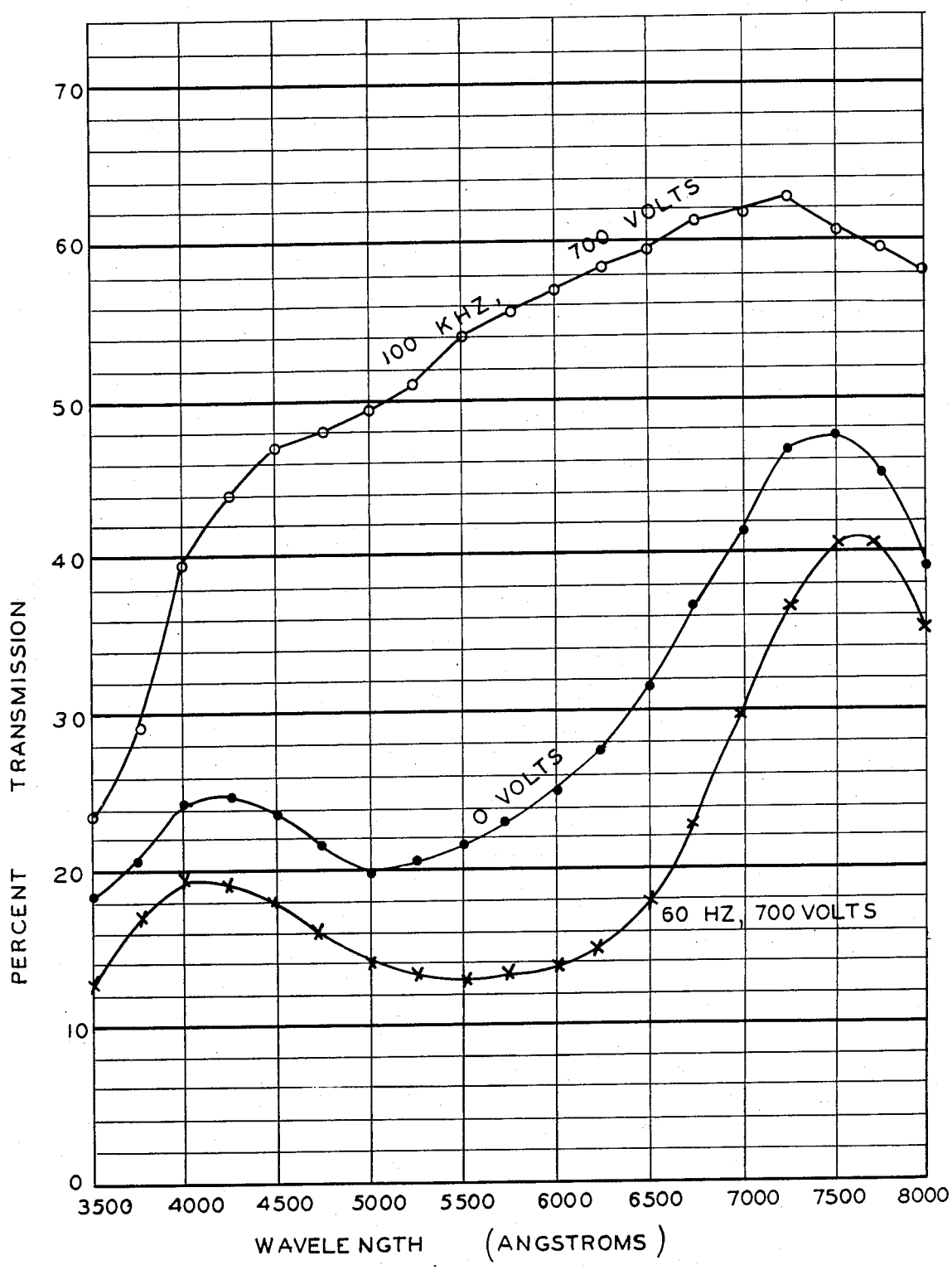

Table I and FIGS. 5, 6, 7 and 8, and 9 are for the suspension of Example I. As a variation of this Example, a suspension was made with the tetrapolymer of this Example, except that, in Step 3, 1.2 grams of iodine was used instead of 1.8 grams of iodine. The result is shown in FIG. 10 for activating frequencies of 60 Hz and 100 KHz, both at the same voltage of 700 volts peak-to-peak. The 60 Hz curve is below the zero volt curve at all wavelengths from 3500 to 8000 Angstroms, i.e., the light valve closes at this low frequency at all wavelengths in this spectral range; which is not according to prior art. The 100 KHz curve is above the zero volt curve at all wavelengths in this spectral range; i.e., the light valve opens at this high frequency at all wavelengths in this spectral range.

The performance of Example I has now been described in Table I and in FIGS. 5, 6, 7, 8, 9 and 10. Similar results obtained with the suspensions of the other Examples herein, are given below.

Using the suspension of Example II, a light valve cell with an inactivated (zero volt) optical density of 2.0 was activated with 250 volts peak-to-peak at a frequency of 60 Hz and at a frequency of 60 KHz. At 60 KHz the cell opened to an optical density of 1.1. At 60 Hz the cell closed to an optical density of 2.3. In the prior art, the density ratio would be 2.0/1.1 or 1.8. In this invention, the optical density ratio is 2.3/1.1 or 2.09, which is higher than it would be in the prior art.

The suspension of Example III was activated by 800 volts peak-to-peak at 60 Hz and at 60 KHz. The optical densities were 2.20 at zero volts (inactivated light valve); 2.82 at 60 Hz and 0.80 at 60 KHz. In the prior art the optical density ratio would be 2.20/.80 or 2.75. In accordance with the present invention, the density ratio is 2.82/.80 or 3.52. At a frequency of 18 KHz, the optical density remained the same as at zero volts (inactivated state). This frequency is referred to as the crossover frequency, because it is the frequency at which the light valve neither opens nor closes when the valve is activated.

The suspension in Example IV was activated in a light valve with 800 volts peak-to-peak at an activating frequency of 60 Hz and at an activating frequency of 10 KHz. The optical density in the inactivated state (zero volts) was 2.3. The optical density at 60 Hz was 3.0. The density at 10 KHz was 1.1. The optical density ratio according to prior art was 2.3/1.1 or 2.09. The optical density ratio according to this invention was 3.0/1.1 or 2.72.

The suspension of Example V was activated at 800 volts peak-to-peak at an activating frequency of 60 Hz and at an activating frequency of 50 KHz. The optical densities were 2.2 in the inactivated state; 2.7 at 60 Hz; and 0.9 at 50 KHz. The prior art optical density ratio was 2.2/.9 or 2.44. The optical density ratio per this invention was 2.7/.9 or 3.0.

The suspension of Example VI was activated with 800 volts peak-to-peak at 60 Hz and at 60 KHz. The optical densities were: 2.22 inactivated (zero volts applied); 2.30 at 60 Hz; and 1.20 at 60 KHz. The crossover frequency, i.e., the frequency at which the light valve neither opens nor closes, was 11 KHz.

The optical densities given in the above discussions of Examples, II, III, IV, V and VI are measured with white light from an incandescent lamp i.e., these optical densities are integrated over the visible spectrum.

Figure 11:
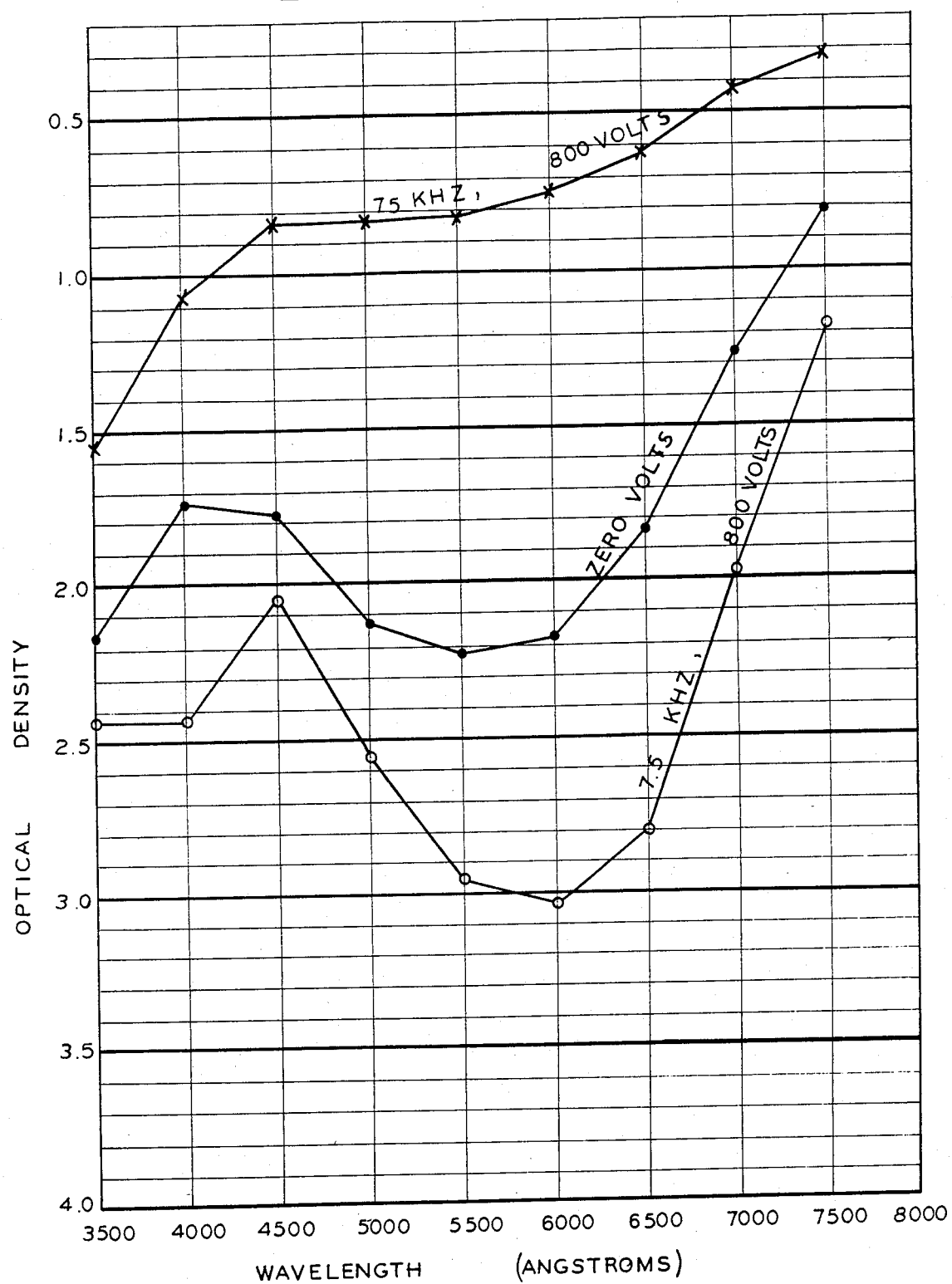

FIG. 11 gives the spectral response to the suspension of Example VII at an activating frequency of 7.5 KHz and an activating frequency of 75 KHz, both at 800 volts peak-to-peak. The 7.5 KHz curve is below the zero volt (inactivated) curve at all wavelengths from 3500 to 8000 Angstroms; and the 75 KHz curve is above the zero volt curve at all these wavelengths. Thus, the suspension and valve close at the lower of these two frequencies at all wavelengths in the spectral range, contrary to prior art; whereas the suspension and valve open at the higher frequency at all wavelengths in this same spectral range.

In the seven examples given hereinabove, either calcium iodide or cesium iodide was used to prepare the suspension. Similar results and similar performances, i.e., the reverse light valve effect at low activating frequencies in the spectral range from 3500 to 8000 Angstroms, were obtained when potassium iodide, rubidium iodide, ammonium iodide, or nickel iodide were used instead of calcium iodide in Step 3 of Example I.

While specific embodiments of the invention have been described it will be appreciated that many modifications thereon may be made by one skilled in the art, which fall within the spirit and scope of the invention.

We claim:

1. A light valve for controlling the transmission of radiation in the electromagnetic spectrum comprising:
   a cell having front and rear wall sections spaced apart a distance which is small compared to the lateral dimensions of the sections,
   a fluid suspension in said cell of minute particles dispersed therein capable of having their orientation changed by the application of an electric field to the suspension to change the transmission of radiation through the suspension,
   means for applying an electric field to the suspension between said wall sections in a direction substantially parallel to the direction of transmission of radiation through the suspension and substantially perpendicular to said wall sections, and
   said suspension being characterized in that it is responsive to said field applied in said direction to decrease the level of transmission of radiation therethrough, substantially throughout the electromagnetic spectrum below the level of transmission of radiation when the field is not applied to the suspension.

2. The light valve of claim 1 wherein the electromagnetic spectrum comprises the visible electromagnetic spectrum.

3. The light valve of claim 2 wherein the electromagnetic spectrum is 3500–8000 Angstroms.

4. The light valve of claim 1 wherein the suspension includes a meterial taken from the group comprising: poly (3,5,5 trimethyl-1-hexyl acrylate/2-hydroxypropyl acrylate/di-z-ethylhexyl fumarate/fumaric acid) poly (3,5,5-trimethyl-1-hexyl acrylate/2-hydroxypropyl acrylate/vinylidine chloride/fumaric acid); poly (3,5,5 triemthyl-1-hexyl acrylate/2-hydroxypropyl acrylate/di-ethylhexyl maleate/fumaric acid); poly (3,5,5 trimethyl-1-hexyl acrylate/2-hydroxpropyl acrylate/dibutyl tin laurate maleate/fumaric acid); poly (3,5,5 trimethyl-1-hexyl acrylate/2-hydroxypropyl acrylate/distearyl fumarate/fumaric acid); and poly (3,5,5-trimethyl-1-hexyl acrylate/2-hydroxypropyl acrylate/fumaric acid).

5. The light valve of claim 1 including particles derived from quinine bisulfate.

6. The light valve of claim 1 wherein the dispersed particles include in their molecular structure an iodide from the following group: calcium iodide, cesium iodide, potassium iodide, rubidium iodide, ammonium iodide, and nickel iodide.

7. A material for controlling the transmission of radiation in the electromagnetic spectrum comprising a fluid suspension including:
   a suspending medium and
   a plurality of minute particles dispersed therein capable of having their orientation changed by the application of an electric field to the suspension to change the transmission of radiation therethrough, characterized in that it is responsive to said field applied in a direction substantially parallel to the direction of transmission of radiation through the suspension to decrease the level of transmission of radiation therethrough throughout the electromagnetic spectrum below the line of transmission of radiation when said field is not applied to the suspension.

8. A material for claim 7 wherein the electromagnetic spectrum comprises the visible electromagnetic spectrum.

9. The material for claim 8 wherein the visible eclectromagnetic spectrum is 3500–8000 Angstroms.

10. The material for claim 7 wherein the suspension includes a material taken from the group comprising: poly (3,5,5 trimethyl-1-hexyl acrylate/2-hydroxypropyl acrylate/di-2-ethylhexyl fumarate/fumaric acid); poly (3,5,5 trimethyl-1-hexyl acrylate/2-hydroxypropyl acrylate/vinylidine chloride/fumaric acid); poly (3,5,5 trimethyl-1-hexyl acrylate/2-hydroxypropyl acrylate/-di-ethylhexyl maleate/fumaric acid); poly (3,5,5 trimethyl-1-hexyl acrylate/2-hydroxypropyl acrylate/dibutyl tin laurate maleate/fumaric acid); poly (3,5,5 trimethyl-1-hexyl acrylate 2/-hydroxypropyl acrylate/-distearyl fumarate/fumaric acid); and poly (3,5,5 trimethyl-1-hexyl acrylate/2-hydroxypropyl acrylate/fumaric acid).

11. A material for claim 7 including particles derived from quinine bisulfate.

12. A material of claim 7 wherein the suspension includes particles that include in their molecular structure an iodide from the following group: calcium iodide, cesium iodide, potassium iodide, rubidium iodide, ammonium iodide, and nickel iodide.

* * * * *